United States Patent
Chuo et al.

(10) Patent No.: US 6,229,584 B1
(45) Date of Patent: May 8, 2001

(54) LIQUID CRYSTAL DISPLAY MONITOR HAVING A MONITOR STAND WITH A REPLACEABLE HOUSING PART

(75) Inventors: Yu-Hsin Chuo; Chih-Peng Ma, both of Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/440,510

(22) Filed: Nov. 15, 1999

(51) Int. Cl.[7] .................... G02F 1/1333; H05K 5/00
(52) U.S. Cl. .................... 349/58; 345/905; 361/681; 248/917
(58) Field of Search .................... 349/58, 60; 345/905; 361/681, 682; 348/180, 184, 325; 248/917; 16/376, 372

(56) References Cited

U.S. PATENT DOCUMENTS

| | | | |
|---|---|---|---|
| D. 415,478 | * 10/1999 | Chuo et al. | D14/113 |
| D. 416,875 | * 11/1999 | Chuo et al. | D14/113 |
| D. 431,566 | * 10/2000 | Chuo et al. | D14/375 |
| 4,814,759 | * 3/1989 | Gombrich et al. | 340/771 |
| 5,016,849 | * 5/1991 | Wu | 248/183 |
| 5,589,849 | * 12/1996 | Ditzik | 345/126 |
| 5,765,794 | * 6/1998 | Chen | 248/292.12 |
| 5,812,368 | * 9/1998 | Chen et al. | 361/681 |
| 5,831,696 | * 11/1998 | Sheng | 349/58 |
| 5,838,536 | * 11/1998 | Miyazawa et al. | 361/681 |
| 5,870,280 | * 2/1999 | Cho | 361/681 |
| 5,903,657 | * 5/1999 | Chuo | 381/388 |

* cited by examiner

Primary Examiner—William L. Sikes
Assistant Examiner—Tarifur R. Chowdhury
(74) Attorney, Agent, or Firm—Pillsbury Winthrop LLP

(57) ABSTRACT

A liquid crystal display monitor includes a monitor stand and a liquid crystal display module. The monitor stand has a base portion adapted to be disposed on a table surface, and a stand portion extending vertically from a top side of the base portion. The stand portion includes complementary first and second housing parts that cooperate to confine a vertical cable passage. The first housing part has an upper end and a lower end mounted immovably on the top side of the base portion. The monitor stand further includes an interlocking unit provided on the first and second housing parts for retaining removably the second housing part on the first housing part. The liquid crystal display module includes a display housing mounted on the upper end of the first housing part. The display housing is formed with a connector mounting cavity that has an open rear side and an open bottom side. The cavity has an electrical connector unit mounted therein. The connector unit is adapted to mate with an electrical cable unit. The display module further includes a cover member mounted on the display housing to cover the open rear side of the cavity.

16 Claims, 5 Drawing Sheets

LIQUID CRYSTAL DISPLAY MONITOR HAVING A MONITOR STAND WITH A REPLACEABLE HOUSING PART

BACKGROUND OF THE INVENTION

1. Field of the Invention

The invention relates to a liquid crystal display monitor, more particularly to a liquid crystal display monitor having a stand housing that can be easily configured to incorporate a universal serial bus module and that can ensure neat arrangement of electrical cables.

2. Description of the Related Art

A universal serial bus module is an optional component for a liquid crystal display monitor. However, in order to meet the demands of different consumers, conventional liquid crystal display monitors must be designed to include or not include a universal serial bus module so as to decrease production time. However, some conventional liquid crystal display monitors do not have an extra space for receiving universal serial bus modules. In other conventional liquid crystal display monitors, it takes more time to install a universal serial bus module even though the conventional liquid crystal display monitor has an allocated space therefor.

SUMMARY OF THE INVENTION

Therefore, the object of the present invention is to provide a liquid crystal display monitor that has a monitor stand with a replaceable housing part to facilitate configuring of the liquid crystal display monitor so as to incorporate a universal serial bus module.

Another object of the present invention is to provide a liquid crystal display monitor that can ensure neat arrangement of electrical cables.

According to the present invention, a liquid crystal display monitor includes a monitor stand and a liquid crystal display module.

The monitor stand has a base portion adapted to be disposed on a table surface, and a stand portion extending vertically from a top side of the base portion. The stand portion includes complementary first and second housing parts that cooperate to confine a vertical cable passage. The first housing part has an upper end and a lower end mounted immovably on the top side of the base portion. The monitor stand further includes an interlocking unit provided on the first and second housing parts for retaining removably the second housing part on the first housing part.

The liquid crystal display module includes a display housing mounted on the upper end of the first housing part. The display housing is formed with a connector mounting cavity that has an open rear side and an open bottom side. The cavity has an electrical connector unit mounted therein. The connector unit is adapted to mate with an electrical cable unit. The display module further includes a cover member mounted on the display housing to cover the open rear side of the cavity.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
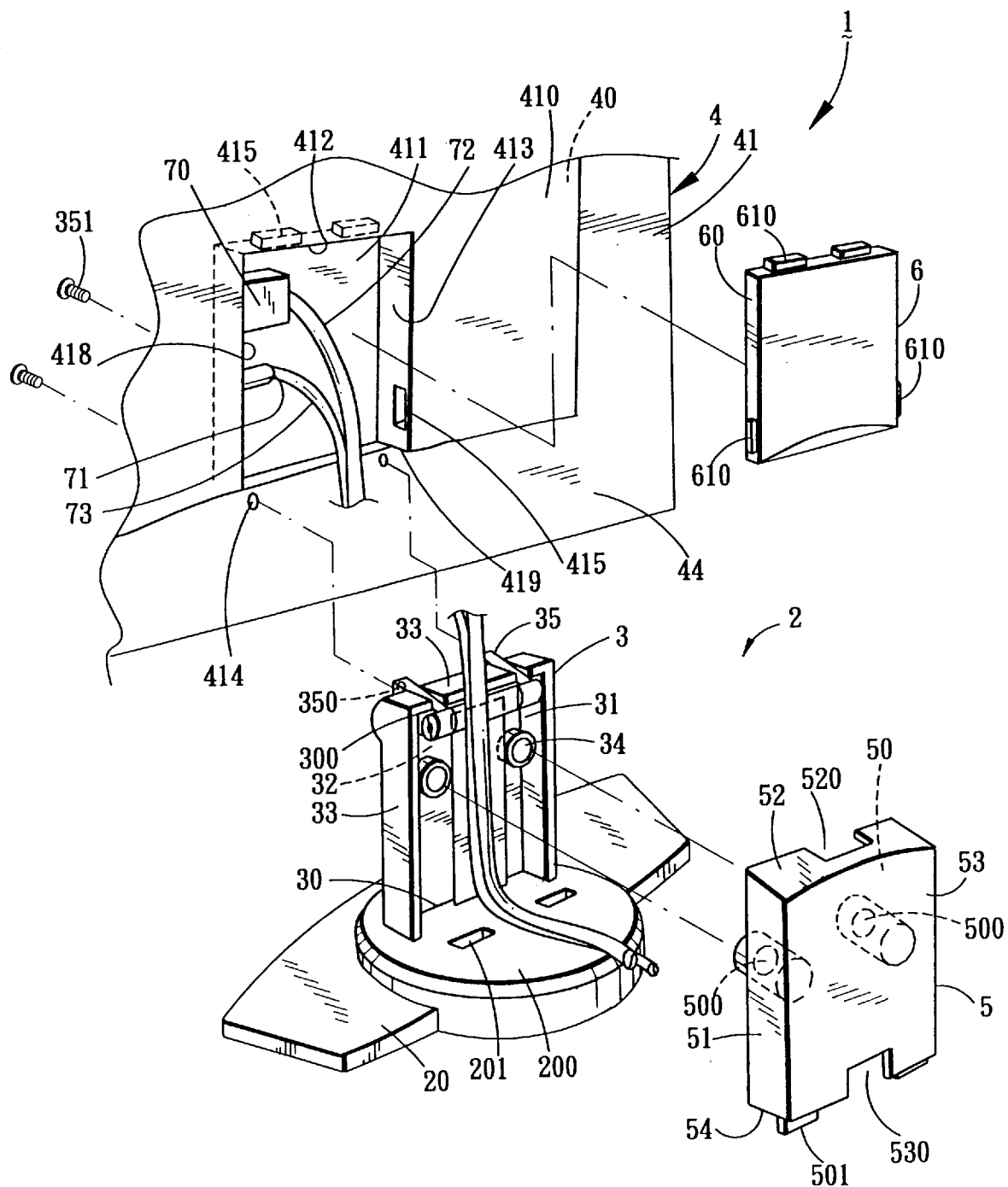
FIG. 1 is a fragmentary exploded perspective view of a first Preferred embodiment of a liquid crystal display monitor according to the present invention.

Before the present invention is described in greater detail, it should be noted that like elements are denoted by the same reference numerals throughout the disclosure.

Figure 2:
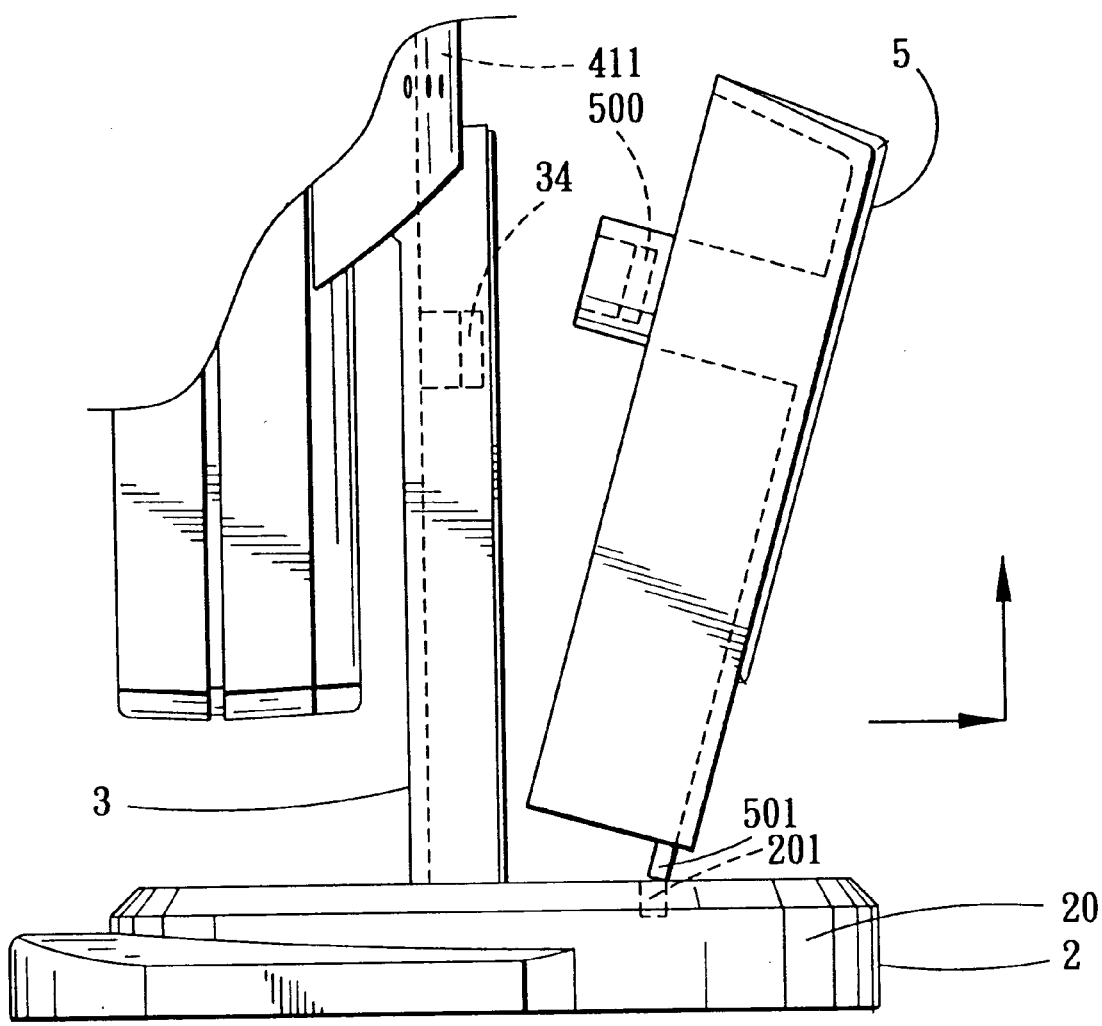
FIG. 2 is a side view of the first preferred embodiment to illustrate how a second housing part of a monitor stand is attached to a first housing part.
Figure 3:
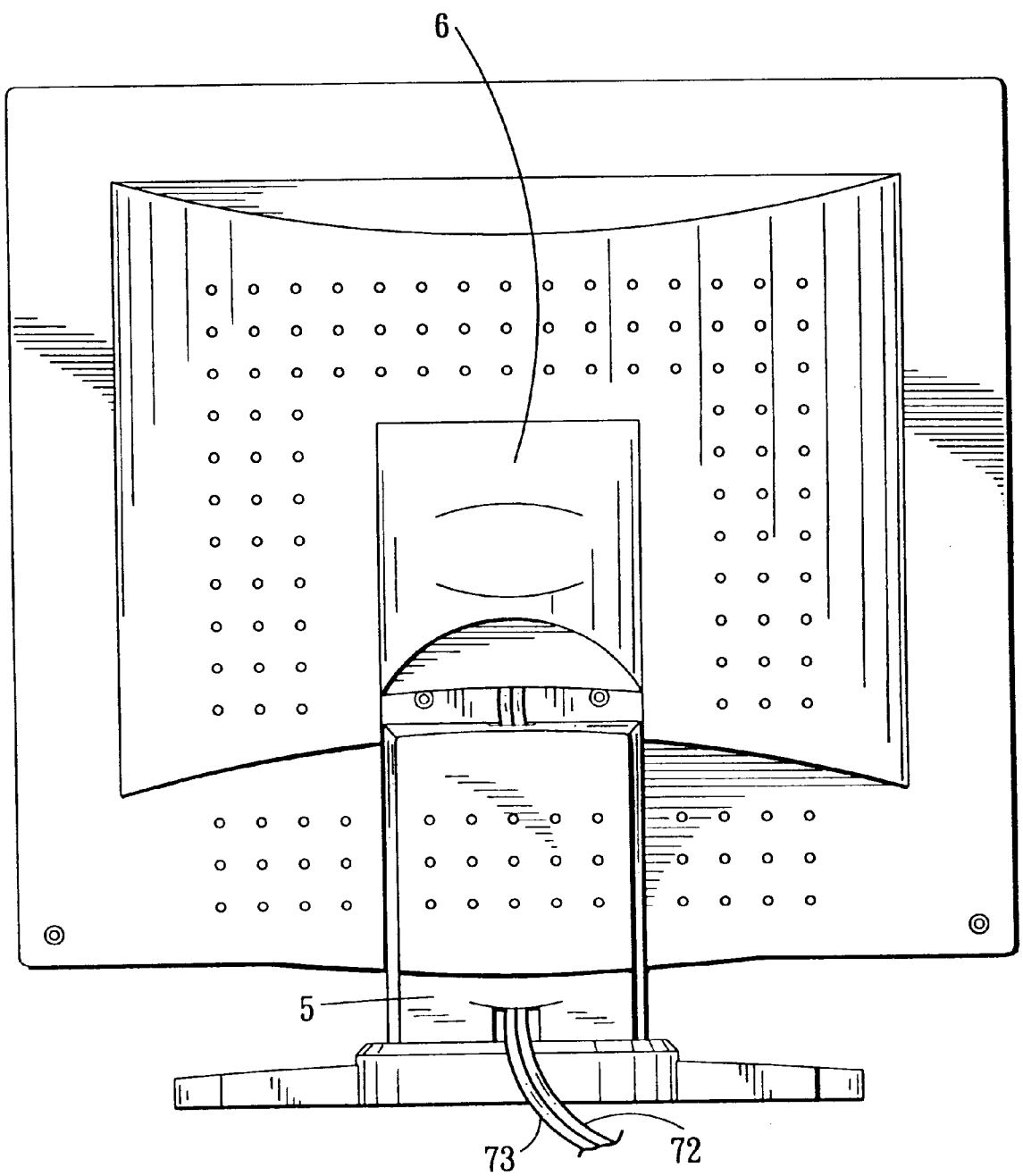
FIG. 3 is a schematic view of the first preferred embodiment.

Referring to FIGS. 1 to 3, the first preferred embodiment of a liquid crystal display monitor 1 according to the present invention is shown to comprise a monitor stand 2 and a liquid crystal display module 4.

The monitor stand 2 has a base portion 2 adapted to be disposed on a table surface (not shown), a stand portion extending vertically from a raised top side 220 of the base portion 2, and an interlocking unit. The stand portion includes complementary first and second housing parts 3, 5 that cooperate to confine a vertical cable passage. The first housing part 3 has an upper end 33 and a lower end mounted immovably on the top side 200 of said base portion 20. The first housing part 3 includes a front wall 32 and a first peripheral wall that extends rearwardly from a periphery of the front wall 32 so as to form the first housing part 3 with a rearwardly opening space 31. The second housing part 5 includes a rear wall 53 and a second peripheral wall 51 that extends forwardly from a periphery of the rear wall 53 so as to form the second housing part 5 with a forwardly opening space 50 having a bottom end. The second peripheral wall 51 of the second housing part 5 has a top section 52 formed with an entry port 520. The rear wall 53 of the second housing part 5 is formed with an exit port 530 adjacent to the bottom end of the forwardly opening opening space 50. The second housing part 5 has a lower end 54. The lower end 54 of the second housing part 5 and the raised top side 200 of the base portion 2 are formed with a plug-and-hole unit for engagement therebetween. In this embodiment, the plug-and-hole unit includes two insert holes 201 formed in the raised top side 200 of the base portion 2, and two stubs 501 formed on the lower end 54 of the second housing part 5 to engage removably and respectively the insert holes 201. The interlocking unit includes two first magnet members 34 mounted on the front wall 32 of the first housing part 3 and extending rearwardly therefrom, and two second magnet members 500 mounted on the rear wall 53 of the second housing part 5 and extending forwardly therefrom. The first and second magnet members 34, 500 have opposite magnetic polarities and are capable of attracting magnetically with each other for retaining removably the second housing part 5 on the first housing part 3.

The liquid crystal display module 4 includes a display housing 41 that is mounted pivotally on a pivot member 35 provided on the upper end 33 of the first housing part 3. Screws 351 extend through holes 414 in the display housing 41 and engage holes 350 formed in the pivot member 35. Since the specific configuration of the pivot member 35 is known in the art and is not critical to the present invention, a detailed description of the same is omitted herein for the sake of brevity. The display housing 41 is formed with a connector mounting cavity 411 that has an open rear side 418 and an open bottom side 419. The cavity 411 has an electrical connector unit mounted therein. The connector unit is adapted to mate with an electrical cable unit. The connector unit includes a display power connector 71 adapted to mate with a power cord cable 73 of the electrical cable unit, and a signal connector 70 adapted to mate with a display cord cable 72 of the electrical cable unit. The cavity 411 is vertically aligned with the monitor stand 2, and has a peripheral confining wall 413 that defines a depth of the cavity 411 and the open rear and bottom sides 418, 419 of the cavity 411. The connector unit is mounted on the peripheral confining wall 413. The cavity 411 has a size sufficient to accommodate a connecting end portion of the cable unit therein such that a remaining portion of the cable unit extends through the bottom side 419 of the cavity 411. Under such a condition, the remaining portion of the cable unit can be led into the cable passage of the monitor stand 2 via the entry port 520, and out of the cable passage via the exit port 530. The peripheral confining wall 413 of the cavity 411 is formed with a plurality of grooves 415. A cover member 6 is formed with a plurality of peripheral stubs 610 engaging removably the grooves 415 for retaining removably the cover member 6 on the display housing 41 so as to cover the rear side 418 of the cavity 411 and conceal the connecting end portion of the cable unit.

In another embodiment, the cover member 6 and the second housing part 5 can be connected to one another via a pivot unit (not shown).

Figure 4:
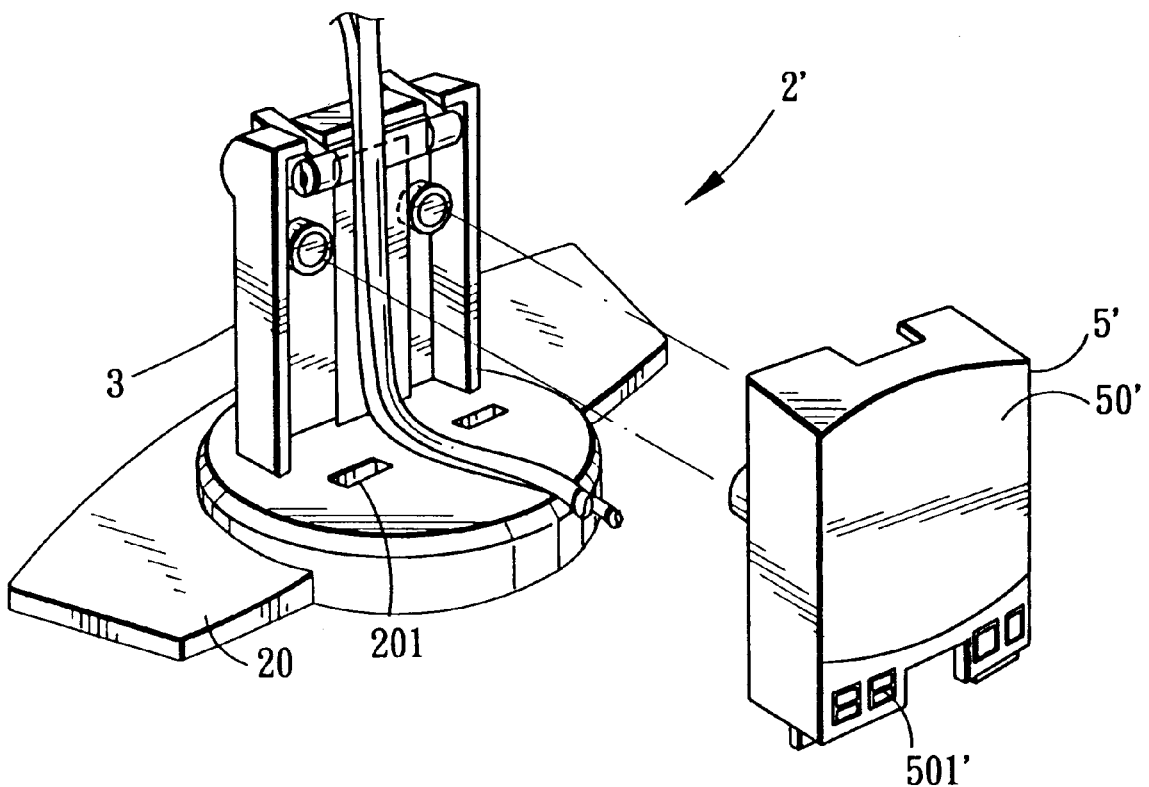
FIG. 4 is an exploded perspective view of a monitor stand of a second preferred embodiment of a liquid crystal display monitor.

FIG. 4 illustrates a stand portion 2' of the second preferred embodiment of a liquid crystal display monitor according to the present invention. In this embodiment, the second housing part 5 of the previous embodiment is replaced by one that includes a universal serial bus module 501' mounted on the second housing part 5' and disposed in the forwardly opening space. Replacement as such can be conducted with ease due to the presence of the interlocking unit and the plug-and-hole unit.

Figure 5:
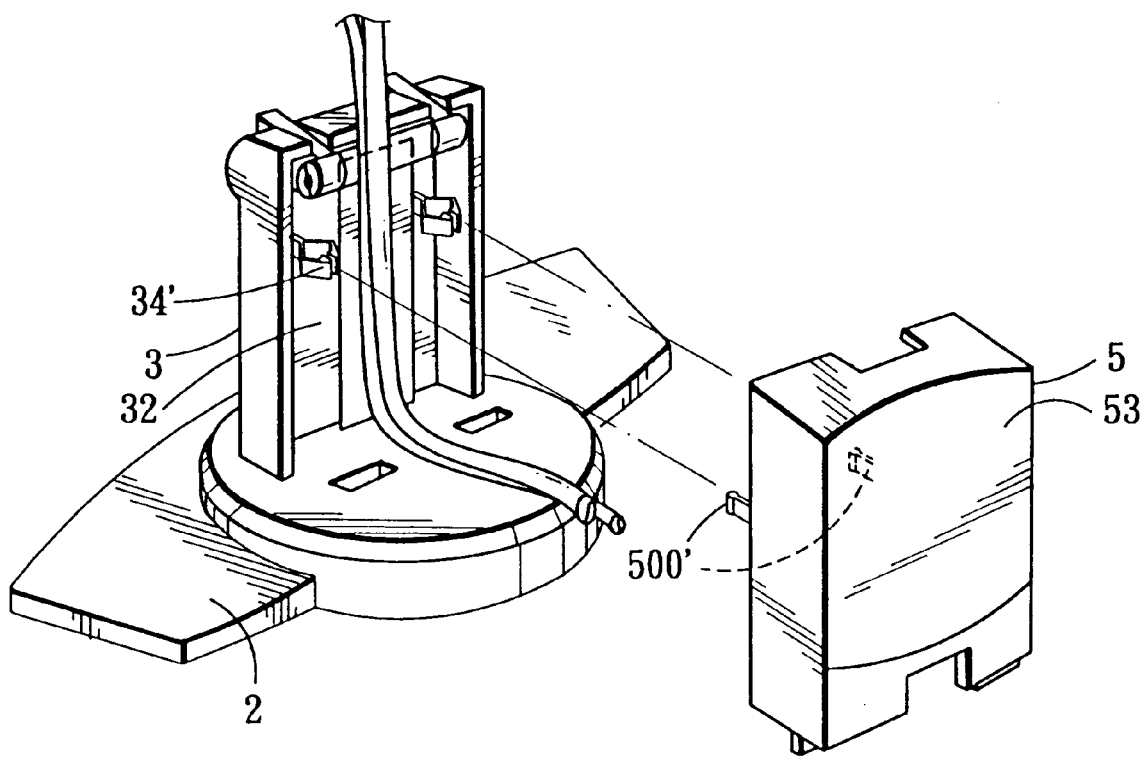
FIG. 5 is an exploded perspective view of a monitor stand of a third preferred embodiment of a liquid crystal display monitor according to the present invention.

FIG. 5 illustrates an interlocking unit of the third preferred embodiment of a liquid crystal display monitor according to the present invention. In this embodiment, the interlocking unit includes two clips 34' provided on the first housing part 3, and two pins 500' provided on the second housing part 5 for engaging removably the clips 34'.

In the present invention, the second housing parts 5, 5' can easily be detached. Thus, the production time of a liquid crystal display monitor having a universal serial bus module can be reduced. In addition, electrical cables can be neatly arranged on the liquid crystal display monitor of this invention. The objects of the present invention are thus met.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A liquid crystal display monitor comprising:
    a monitor stand having a base portion adapted to be disposed on a table surface, and a stand portion extending vertically from a top side of said base portion, said stand portion including complementary first and second housing parts that cooperate to confine a vertical cable passage, said first housing part having an upper end and a lower end mounted immovably on said top side of said base portion, said monitor stand further including an interlocking unit provided on said first and second housing parts for retaining removably said second housing part on said first housing part; and
    a liquid crystal display module including a display housing mounted on said upper end of said first housing part, said display housing being formed with a connector mounting cavity that has an open rear side and an open bottom side, said cavity having an electrical connector unit mounted therein, said connector unit being adapted to mate with an electrical cable unit, said display module further including a cover member mounted on said display housing to cover said open rear side of said cavity.

2. The liquid crystal display monitor as claimed in claim 1, wherein said cavity is vertically aligned with said monitor stand, and has a peripheral confining wall that defines a depth of said cavity and said open rear and bottom sides of said cavity, said connector unit being mounted on said peripheral confining wall, said cavity having a size sufficient to accommodate a connecting end portion of the cable unit therein such that a remaining portion of the cable unit extends through said open bottom side of said cavity.

3. The liquid crystal display monitor as claimed in claim 2, wherein said monitor stand has an upper portion formed with an entry port that is adapted to lead the remaining portion of the cable unit into said cable passage, and a lower portion formed with an exit port that is adapted to lead the remaining portion of the cable unit out of said cable passage.

4. The liquid crystal display monitor as claimed in claim 3, wherein said first housing part includes a front wall and a first peripheral wall that extends rearwardly from a periphery of said front wall so as to from said first housing part with a rearwardly opening space, said second housing part including a rear wall and a second peripheral wall that extends forwardly from a periphery of said rear wall so as to form said second housing part with a forwardly opening space having a bottom end.

5. The liquid crystal display monitor as claimed in claim 4, wherein said second peripheral wall has a top section formed with said entry port, and said rear wall is formed with said exit port adjacent to said bottom end of said forwardly opening space.

6. The liquid crystal display monitor as claimed in claim 1, wherein said second housing part has a lower end, said lower end of said second housing part and said top side of said base portion being formed with a plug-and hole unit for engagement therebetween.

7. The liquid crystal display monitor as claimed in claim 6, wherein said plug-and-hole unit includes at least one insert hole formed in one of said lower end of said second housing part and said top side of said base portion, and at least one insert stub formed on the other one of said lower end of said second housing part and said top side of said base portion to engage removably said insert hole.

8. The liquid crystal display monitor as claimed in claim 1, wherein said interlocking unit includes at least one set of oppositely polarized magnet members mounted respectively on said first and second housing parts.

9. The liquid crystal display monitor as claimed in claim 1, wherein said interlocking unit includes at least one clip provided on one of said first and second housing parts, and at least one pin provided on the other one of said first and second housing parts for engaging removably said clip.

10. The liquid crystal display monitor as claimed in claim 1, wherein said first housing part includes a front wall and a first peripheral wall that extends rearwardly from a periphery of said front wall so as to from said first housing part with a rearwardly opening space, said second housing part including a rear wall and a second peripheral wall that extends forwardly from a periphery of said rear wall so as to from said second housing part with a forwardly opening space.

11. The liquid crystal display monitor as claimed in claim 10, wherein said interlocking unit includes at least one first magnet member mounted on said front wall and extending rearwardly therefrom, and at least one second magnet member mounted on said rear wall and extending forwardly therefrom, said first and second magnets members having opposite magnetic polarities and being capable of attracting magnetically with each other for retaining removably said second housing part on said first housing part.

12. The liquid crystal display monitor as claimed in claim 10, wherein said interlocking unit includes at least one clip mounted on said front wall and extending rearwardly therefrom, and at least one pin mounted on said rear wall and extending forwardly therefrom, said clip engaging removably said pin for retaining removably said second housing part on said frist housing part.

13. The liquid crystal display monitor as claimed in claim 1, further comprising a universal serial bus module mounted on said second housing part and disposed in said forwardly opening space.

14. The liquid crystal display monitor as claimed in claim 1, further comprising a universal serial bus module mounted on said second housing part.

15. The liquid crystal display monitor as claimed in claim 1, wherein said electrical connector unit includes a display power connector adapted to mate with a power cord cable of the electrical cable unit, and a signal connector adapted to mate with a display cord cable of the electrical cable unit.

16. The liquid crystal display monitor as claimed in claim 1, wherein said upper end of said first housing part is provided with a pivot member for mounting pivotally said display housing on said first housing part.

* * * * *